(12) United States Patent
Knechtges et al.

(10) Patent No.: US 9,266,517 B2
(45) Date of Patent: Feb. 23, 2016

(54) SENSOR MODULE FOR A MASTER CYLINDER

(75) Inventors: Josef Knechtges, Mayen (DE); Niko Naether, Nastaetten (DE); Thomas Baron, Leimbach (DE); Karl-Heinz Schaust, Fachbach (DE); Klaus Ullmer, Koblenz (DE)

(73) Assignee: Lucas Automotive GmbH, Koblenz (DE)

( * ) Notice: Subject to any disclaimer, the term of this patent is extended or adjusted under 35 U.S.C. 154(b) by 246 days.

(21) Appl. No.: 13/810,241

(22) PCT Filed: Jul. 15, 2011

(86) PCT No.: PCT/EP2011/003551
§ 371 (c)(1),
(2), (4) Date: Jun. 5, 2013

(87) PCT Pub. No.: WO2012/007178
PCT Pub. Date: Jan. 19, 2012

(65) Prior Publication Data
US 2014/0144223 A1 May 29, 2014

(30) Foreign Application Priority Data

Jul. 16, 2010 (DE) .......................... 10 2010 027 308

(51) Int. Cl.
| | |
|---|---|
| *B60T 17/22* | (2006.01) |
| *B60T 7/04* | (2006.01) |
| *B60T 11/16* | (2006.01) |
| *B60T 13/52* | (2006.01) |
| *G01L 5/28* | (2006.01) |

(52) U.S. Cl.
CPC ................ *B60T 17/22* (2013.01); *B60T 7/042* (2013.01); *B60T 11/16* (2013.01); *B60T 13/52* (2013.01); *G01L 5/28* (2013.01)

(58) Field of Classification Search
CPC ......... B60T 11/16; B60T 13/52; B60T 17/22; B60T 7/042; G01L 5/28
USPC ........................................................... 73/132
See application file for complete search history.

(56) References Cited

U.S. PATENT DOCUMENTS

| | | | |
|---|---|---|---|
| 5,725,291 A | 3/1998 | Michels | |
| 6,253,656 B1 | 7/2001 | Gilles | |
| 6,324,845 B1 * | 12/2001 | Fulks et al. | ..................... 60/582 |

(Continued)

FOREIGN PATENT DOCUMENTS

| | | |
|---|---|---|
| CN | 101622150 A | 1/2010 |
| DE | 19855358 A1 | 6/2000 |

(Continued)

OTHER PUBLICATIONS

Chinese First Search Report, Application No. 201180043645.8, dated Jul. 29, 2014.

*Primary Examiner* — Freddie Kirkland, III
(74) *Attorney, Agent, or Firm* — MacMillan, Sobanski & Todd, LLC (57) ABSTRACT

A sensor assembly for use with a master cylinder is described. The master cylinder comprises an input-side activation element to which a signal transmitter element is coupled. The sensor module comprises a travel sensor for sensing travel carried out by the activation element, and a position sensor for sensing when a predefined position of the activation element is reached.

21 Claims, 10 Drawing Sheets

(56) References Cited

U.S. PATENT DOCUMENTS

| | | | |
|---|---|---|---|
| 6,564,694 B2* | 5/2003 | Zumberge et al. | 92/5 R |
| 6,652,039 B1* | 11/2003 | Shull et al. | 303/113.2 |
| 7,263,781 B2* | 9/2007 | Sielemann | 33/708 |
| 8,063,627 B2 | 11/2011 | Cagnac et al. | |
| 8,631,694 B2* | 1/2014 | Vollert et al. | 73/132 |
| 8,829,893 B2* | 9/2014 | Youngner et al. | 324/202 |
| 2002/0117893 A1* | 8/2002 | Shaw et al. | 303/113.4 |
| 2003/0000375 A1* | 1/2003 | Zumberge et al. | 92/5 R |
| 2003/0205931 A1 | 11/2003 | Muller et al. | |
| 2008/0312801 A1* | 12/2008 | Muller et al. | 701/71 |
| 2009/0278641 A1* | 11/2009 | Hedayat | 335/284 |
| 2010/0036577 A1 | 2/2010 | Kodama et al. | |
| 2011/0074209 A1* | 3/2011 | Ueno | 303/20 |
| 2011/0146395 A1* | 6/2011 | Vollert et al. | 73/132 |
| 2014/0144223 A1* | 5/2014 | Knechtges et al. | 73/132 |

FOREIGN PATENT DOCUMENTS

| | | |
|---|---|---|
| DE | 10218972 A1 | 2/2003 |
| DE | 102004013191 A1 | 10/2005 |
| EP | 0706924 A1 | 4/1996 |
| EP | 2072969 A1 | 5/2009 |
| WO | 0243996 A1 | 6/2002 |

* cited by examiner

SENSOR MODULE FOR A MASTER CYLINDER

CROSS-REFERENCE TO RELATED APPLICATIONS

This application is a national stage of International Application No. PCT/EP2011/003551 filed Jul. 15, 2011, the disclosures of which are incorporated herein by reference in entirety, and which claimed priority to German Patent Application No. DE 10 2010 027 308.2 filed Jul. 16, 2010, the disclosures of which are incorporated herein by reference in entirety, and is related to co-pending U.S. application Ser. No. 13/810,240.

BACKGROUND OF THE INVENTION

The present disclosure relates generally to the field of motor vehicle brake systems. To be more precise, a sensor assembly for use with a master cylinder of such a brake system is described.

It has already been known for a long time to provide the master cylinder with one or more sensors. For example, the hydraulic pressure prevailing in the master cylinder is a frequently interesting quantity, and for this reason many master cylinders are equipped with a hydraulic pressure sensor. The hydraulic pressure in the master cylinder determined by a sensor can be used to detect the driver input. Furthermore, the vacuum in a vacuum brake booster can be calculated from the master cylinder pressure via a model and hence the operability of the booster determined.

In DE 10 2004 013 191 A, it is proposed to provide in the master cylinder a vacuum region communicating with a vacuum chamber of a vacuum brake booster, and to arrange a vacuum sensor in this vacuum region of the master cylinder. A particular configuration provides for integrating the vacuum sensor with a position sensor of a stop light switch in a sensor assembly and for providing the entire sensor assembly in the vacuum region of the master cylinder.

The sensor assembly known from DE 10 2004 013 191 A comprises a finger-like carrier element, at the tip of which the vacuum sensor and the position sensor are accommodated. For positioning the sensors in the vacuum region of the master cylinder, the carrier element with the sensors accommodated at the front is passed through a channel formed in the master cylinder and opening into the vacuum region.

It has turned out that a vacuum sensor involves considerable cost. For this reason, it is desirable to dispense with the vacuum sensor, at least in low-cost vehicles. Separately from this, it has been found that a travel sensor for determining the brake pedal travel is also frequently installed in addition to the position sensor. This travel sensor may be installed at different places in the region of the brake pedal and requires dedicated mounting and cabling solutions.

BRIEF SUMMARY OF THE INVENTION

A feature on which the invention is based is to specify an alternative concept for a master cylinder sensor assembly which avoids one or more of the aforementioned or other disadvantages of known concepts.

According to a first aspect, there is provided a sensor assembly for use with a master cylinder, which master cylinder has an input-side actuating element, a signal transmitter element detectable by sensors being coupled to the actuating element. The sensor assembly comprises a travel sensor for sensing travel performed by the actuating element and a position sensor for sensing when a predefined position of the actuating element is reached.

The travel sensor may be designed to provide an analog signal (e.g. a continuous signal). The position sensor may be designed to provide a binary signal (e.g. "ON"/"OFF").

According to one realisation, the travel sensor and the position sensor are at a distance from one another. This distance may be chosen in dependence on a linear extension of the signal transmitter element. Both the distance between the travel sensor and the position sensor and the linear extension of the signal transmitter element may be defined in one movement direction of the actuating element or the signal transmitter element.

According to a variant, the distance between the travel sensor and the position sensor may correspond to approximately half the length of the signal transmitter element. Such a distance is advantageous, for example, in the case of a signal transmitter element emitting electromagnetic radiation (e.g. a magnetic element). Depending on the realisation of the sensors and the signal transmitter element, however, a different distance between the travel sensor and the position sensor may also be chosen.

The travel sensor and the position sensor may be designed to sense electromagnetic radiation, such as for example a magnetic flux density. In such an implementation, the travel sensor may be placed in such a manner that, in a starting position of the actuating element, the travel sensor lies approximately in a region of a flux density maximum (going back to the signal transmitter element). If the sensor assembly comprises a further, second travel sensor, the second travel sensor may be placed in such a manner that, in a starting position of the actuating element, the second travel sensor lies approximately in a region of a further flux density maximum. Furthermore, the position sensor may be placed in such a manner that, in a starting position of the actuating element, the position sensor lies approximately in a region between two flux density maxima.

The position sensor may be used for various tasks. For example, the position sensor may be part of a stop light switch. Alternatively or additionally to this, the position sensor may be used for other purposes. Thus, for example, the position sensor may be employed for calibration purposes. In such an implementation, the sensor assembly may be a circuit device which is designed to calibrate (an output signal) of the travel sensor on the basis of an output signal of the position sensor.

The travel sensor and the position sensor may be based on different physical principles. Besides, for example, optical sensors, sensors of magnetic radiation, in particular for sensing a magnetic flux density, are also possible. The sensors may thus be selected from a sensor group comprising the following sensors: Hall sensor, AMR sensor, GMR sensor, CMR sensor and Reed relay. AMR stands for anisotropic magnetoresistive effect, GNR stands for "gigantic" magnetoresistive effect and CMR stands for the "colossal" magnetoresistive effect.

The sensor assembly may further comprise an optional vacuum sensor for sensing a vacuum in a vacuum region, provided for communication with in a vacuum brake booster, of the master cylinder. Furthermore, there may be provided a housing which accommodates the vacuum sensor, the travel sensor and the position sensor. The housing may have a housing opening which permits a communication of the vacuum sensor with the vacuum region of the master cylinder. Furthermore, the housing may have a fastening arrangement for mounting the housing on the outside of the master cylinder.

According to another aspect, there is provided a master cylinder assembly which comprises a master cylinder and the sensor assembly presented here. The master cylinder has the input-side actuating element, a signal transmitter element coupled to the actuating element of the master cylinder and detectable by sensors being additionally provided.

The master cylinder assembly may furthermore have a plunger coupled to the actuating element of the master cylinder. The plunger may carry the signal transmitter element and be provided for plunging into a channel formed in the region of the master cylinder. If the master cylinder has a vacuum region, the channel may be part of this vacuum region.

Also provided is a method for operating a sensor assembly for use in combination with a master cylinder, which master cylinder has an input-side actuating element, to which a signal transmitter element detectable by sensors is coupled, the sensor assembly having a travel sensor and a position sensor. The method comprises the steps of sensing a travel performed by the actuating element by means of the travel sensor and sensing when a predefined position of the actuating element is reached by means of the position sensor.

The method may further comprise comparing the travel performed and when the predefined position which has been sensed by the position sensor is reached. Such a comparison may include, for example, the calibrating (of an output signal) of the travel sensor on the basis of an output signal of the position sensor. The calibrating may be effected on sensing when the predefined position is reached (i.e. for example at a switching point of the position sensor). For the calibrating, the output signal of the travel sensor may be referred to a reference signal when the predefined position is reached. In this connection, for example a gain for the output signal of the travel sensor may be adjusted to be in accordance with the reference signal.

The output signal of the position sensor may undergo a plausibility check. This plausibility check may comprise the redundant evaluation of another signal indicating a braking procedure. Such a signal may, for example, be delivered by a linear acceleration sensor or a wheel speed sensor.

On the basis of an output signal of the travel sensor, further quantities may be determined. The determination of these quantities is particularly accurate and reliable especially with a previous calibration of the travel sensor (and optionally a plausibility check on its output signal). A brake pedal travel and/or a vacuum in a vacuum brake booster may thus be determined on the basis of an output signal of the travel sensor. The respective determination may be effected on the basis of a mathematical calculation (e.g. using a mathematical model).

Other advantages of this invention will become apparent to those skilled in the art from the following detailed description of the preferred embodiments, when read in light of the accompanying drawings.

DETAILED DESCRIPTION OF THE INVENTION

Figure 1:
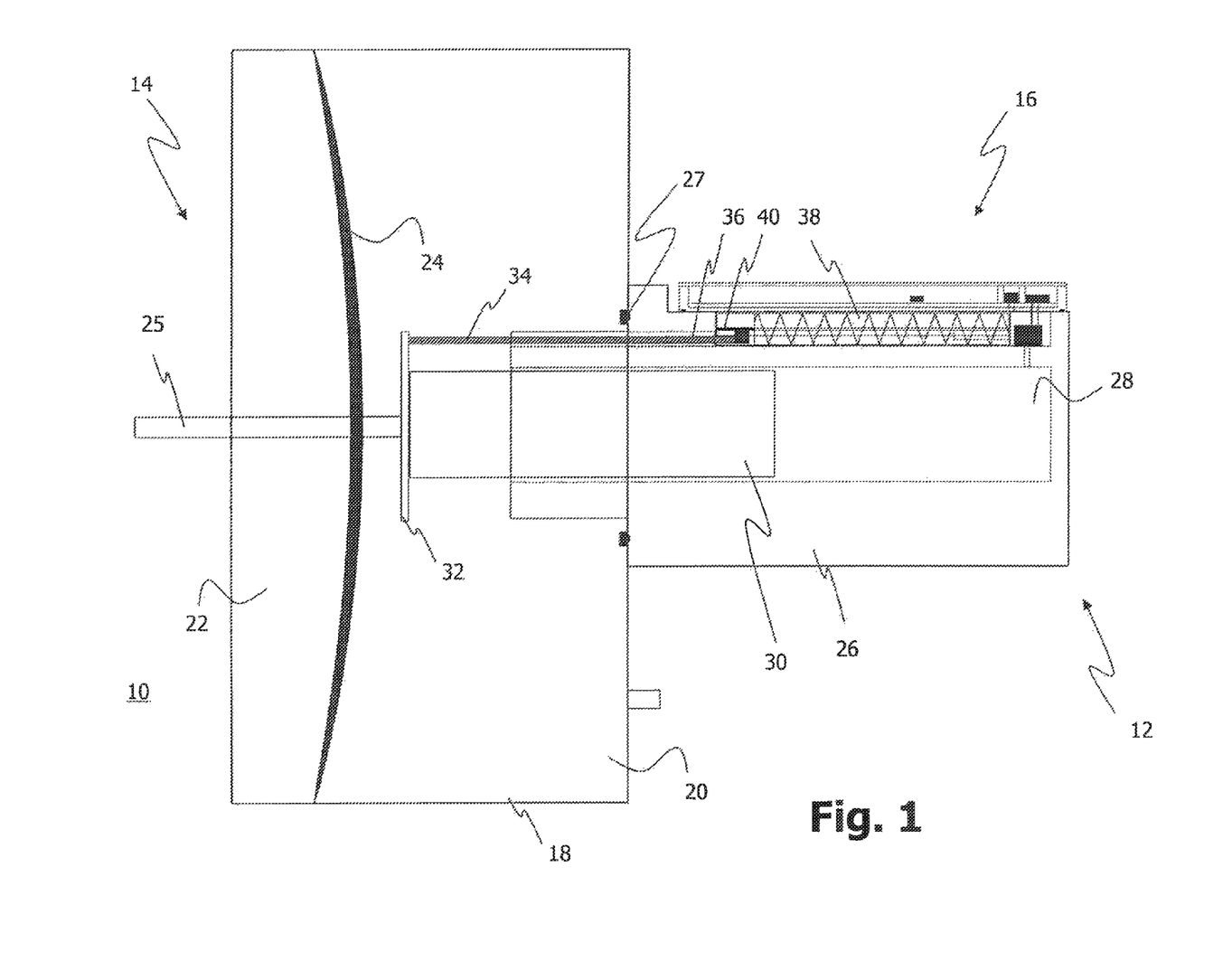
FIG. 1 shows a sectional view of an embodiment of a master cylinder assembly.

FIG. 1 shows an embodiment of a master cylinder assembly, designated generally by 10, for a motor vehicle. The master cylinder assembly 10 comprises a master cylinder 12, a vacuum brake booster 14 fastened to the front side of the master cylinder 12, and a sensor assembly 16 mounted on the outside of the master cylinder. Vacuum brake boosters are used in motor vehicles to boost the foot force applied to a brake pedal by the driver.

The vacuum brake booster 14 comprises a housing 18. Inside the housing 18 are formed a vacuum chamber 20 and a working chamber 22. The working chamber 22 is separated from the vacuum chamber 20 by means of a diaphragm 24 displaceable in the housing 18 in the manner of a piston. The diaphragm 24 in turn is workingly coupled to an input rod 25. The input rod 25 is actuated by means of a brake pedal (not shown).

While driving, a vacuum is continuously maintained in the vacuum chamber 20, whereas the working chamber 22 can be connected either to the vacuum chamber 20 or to atmospheric pressure. As long as the two chambers 20, 22 are connected to one another, the same pressure prevails in both chambers 20, 22, and the diaphragm 24 is situated in its starting position. During a braking procedure, the working chamber 22 is fluidically separated from the vacuum chamber 20 and moreover connected to atmospheric pressure. The resulting pressure increase in the working chamber 22 leads to a pressure difference at the diaphragm 24. This pressure difference in turn causes a displacement of the diaphragm 24 in the direction of the vacuum chamber 20 and hence a boost force on the input rod 25 of the master cylinder 12.

The master cylinder 12 comprises a housing 26 which is fastened to the housing 18 of the brake booster 14 via a sealing element in the form of an O-ring 27. A hydraulic chamber 28 is formed in the housing 26. An actuating piston (primary piston) 30, which is rigidly coupled to the input rod 25, is displaceably guided inside the hydraulic chamber 28. By means of the actuating piston 30, a hydraulic pressure for actuating wheel brakes (not shown) can be built up inside the hydraulic chamber 28. The build-up of brake pressure in the hydraulic chamber 28 is effected by displacement of the actuating piston 30 towards the right in FIG. 1. The displacement of the actuating piston 30 is effected by means of the input rod 25 coupled to the brake pedal and also by means of the diaphragm 24. During this, on the one hand, the foot force introduced into the brake pedal by the driver and, on the other hand, the boost force generated (in the conventional manner) by the brake booster 14 act on the actuating piston 30.

As can be seen from FIG. 1, a plate element 32 is fastened to the actuating piston 30 on its front face facing the input rod 25. The plate element 32 is arranged concentrically with respect to the actuating piston 30 and projects in the radial direction beyond the actuating piston 30. In the vicinity of the outer circumference of the plate element 32 there is rigidly fastened a plunger 34 extending parallel to the actuating piston 30 in the direction of the master cylinder housing 26. The plunger 34 is formed as a rod-like element and extends, via a channel 36 formed in the housing 26, into a recess 38 likewise formed in the housing 26. At its end facing away from the plate element 32, the plunger 34 carries a signal transmitter element 40 for sensing by means of the sensor assembly 16. Owing to the rigid coupling of the plunger 34 to the actuating piston 30, any translational movement of the actuating piston 30 is directly transmitted to the signal transmitter element 40. For this reason, a sensing of a movement or position of the signal transmitter element 40 by means of the sensor assembly 16 enables a movement or position of the actuating piston 30 to be deduced.

In other embodiments, the signal transmitter element 40 may, in principle, be rigidly coupled to an actuating element (e.g. the input rod 25 or the actuating piston 30) of the master cylinder 12 in a different manner. In the simplest case, the signal transmitter element 40 is directly coupled to the actuating element or even identical to the actuating element. Alternatively to this, the signal transmitter element 40 may also be provided on a structure rigidly coupled to the actuating element. This structure may be, for example—as shown in the embodiment according to FIG. 1—a plunger 34 coupled to the actuating element.

As shown in FIG. 1, the input rod 25, the plate element 32, the plunger 34 and the actuating piston 30 are arranged at least partly in the vacuum chamber 20 of the brake booster 14. Furthermore, a vacuum region is defined in the master cylinder 12 via the channel 36 communicating with the vacuum chamber 20 and the recess 38, communicating with the channel 36, of the master cylinder housing 26. The plunger 34 with the signal transmitter element 40 attached thereto plunges into this vacuum region.

Figure 2:
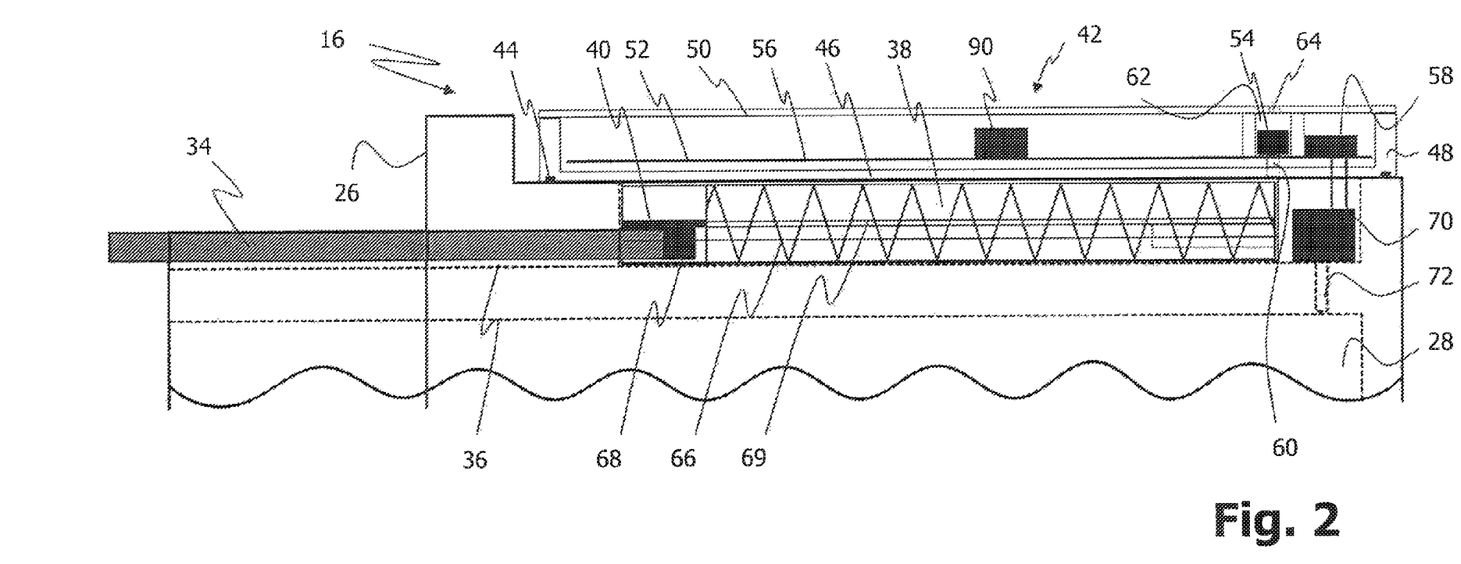
FIG. 2 shows a detail enlargement from FIG. 1, which shows a first embodiment of a sensor assembly.

In order to prevent a loss of vacuum in the vacuum chamber 20 due to atmospheric air entering the vacuum region of the master cylinder 12, the recess 38 of the master cylinder housing 26 is sealed vacuum-tightly by means of the sensor assembly 16. This fact and the configuration of the sensor assembly 16 are explained in more detail in the following with reference to FIG. 2. FIG. 2 shows a detail enlargement of FIG. 1 in the region of the sensor assembly 16.

As shown in FIG. 2, the sensor assembly 16 comprises a housing 42 which is mounted on the outside of the housing 26 of the master cylinder 12. The mounting of the housing 42 of the sensor assembly 16 on the master cylinder housing 26 is effected in such a manner that the recess 38 in the master cylinder housing 26 is sealed vacuum-tightly. For this purpose, a sealing element 44 is provided around the recess 38 between the housing 42 of the sensor assembly 16 and the master cylinder housing 26. This prevents air from the surroundings from penetrating into the vacuum chamber 20 of the brake booster 14 via the recess 38 and the channel 36 in the master cylinder housing 26.

In the embodiment according to FIG. 2, the housing 42 of the sensor assembly 16 is fastened to the master cylinder housing 26 by means of screws (not shown). Owing to the suction effect prevailing in the vacuum region of the master cylinder 12, the housing 42 may, however, also be mounted on the outside of the master cylinder 12 using less stable fastening arrangements. For example, hinged or snap-in connections would also be possible for the mounting of the housing 42.

In the embodiment according to FIG. 2, the housing 42 comprises a first housing element which defines a bottom side 46 and a side wall 48 of the housing 42, and a second housing element which is formed as a cover 50 and which closes the first housing element at the top side. A printed circuit board (PCB) is accommodated in the housing 42. A vacuum sensor 54, a linear or planar travel sensor 56 and a circuit device 58 are mounted on the printed circuit board 52. Furthermore, a position sensor 90 is mounted on the printed circuit board.

The vacuum sensor 54 permits the sensing of a vacuum in the vacuum region of the brake booster 14. For this purpose, an opening 60 formed in the bottom side 46 of the housing 42 enables a communication of the vacuum sensor 54 with the recess 38 formed in the master cylinder housing 26 and hence—via the channel 36—with the vacuum chamber 20 of the brake booster 14. The vacuum sensor 54 (or the printed circuit board 52) seals the housing opening 60 vacuum-tightly with respect to an interior space of the housing 42 of the sensor assembly 16.

As shown in FIG. 2, the vacuum sensor 54 is itself arranged in a chamber 64 formed in the interior space of the housing 42. The housing cover 50 has a cover opening 64 in the region of the chamber 62. For this reason, atmospheric pressure prevails in the interior of the chamber 62, in order to enable a pressure difference-based vacuum sensing by means of the vacuum sensor 54. The chamber 62 itself is sealed off vacuum-tightly with respect to the rest of the interior space of the housing 42.

The travel sensor 56 is formed in a linear or planar manner on the printed circuit board 52 and is therefore not immediately discernable in the sectional view according to FIG. 2. In the embodiment according to FIG. 2, the travel sensor 56 is designed as a continuous or linear Hall sensor for sensing a travel performed by the actuating piston 30. The sensing of the travel performed by the actuating piston 30 is effected indirectly via a sensing of the travel performed by the signal transmitter element 40 rigidly coupled to the actuating piston 30. In the present embodiment, the signal transmitter element 40 is realised as a permanent magnet, the magnetic field of which is sensed by means of the travel sensor 56 designed as a Hall sensor.

The position sensor 90 enables the sensing of when a predefined position of the signal transmitter element 40 (and hence of the actuating piston 30) is reached. The position sensor 90 may be designed, for example, as part of a stop light switch (not shown) and as a binary (switching) Hall sensor.

The circuit device 58 is electrically coupled to the vacuum sensor 54 as well as the travel sensor 56 and the position sensor 90, and includes suitable signal conditioning circuits for the three sensors 54, 56, 90. In one embodiment, the circuit device 58 is formed as an ASIC (Application Specific Integrated Circuit).

The circuit device 58 provides its output signals to an external control unit via a common electrical connection (for example a multipole electrical connector), not shown in FIG. 2. As regards the electrical interfaces, various configurations are available (e.g. CAN, SENT, PSI5, PAS4, PWM, analog, etc.). The external control unit may be an electronic control unit (ECU). According to an alternative configuration, the circuit device 58 itself comprises the required control unit functionalities according to the "smart sensor" concept. The circuit device 58 may in this case be linked to a higher-level control system (for example via a CAN bus).

As can be seen in FIG. 2, a spring element 66 formed as a helical spring is arranged in the recess 38, which spring element exerts a return force (towards the left in FIG. 2) on the plunger 34 carrying the signal transmitter element 40. The spring element 66 ensures that, after completion of a braking procedure, the plunger 34 with the signal transmitter element 40 always returns to its starting position shown in FIG. 2 again. The signal transmitter element 40 is mounted on the plunger 34 via a slide 68. The slide 68 in turn is guided movably in a groove 69 formed in a side wall of the recess 38 or of a separate signal transmitter cartridge.

In the embodiment according to FIG. 2, a hydraulic pressure sensor 70 is furthermore provided in the recess 38 of the master cylinder housing 26. The hydraulic pressure sensor 70 is fastened to the bottom of the recess 38 and communicates with the hydraulic chamber 28 via a bore 72. The bore 72 is sealed off hydraulically-tightly with respect to the recess 38 by means of the pressure sensor 70. As shown in FIG. 2, the hydraulic pressure sensor 70 is electrically contacted by the circuit device 58. In a similar manner to that described in relation to the sensors 54, 56, 90, the circuit device 58 also includes a signal conditioning circuit for the hydraulic pressure sensor 70 and delivers a corresponding output signal which can be tapped via a common electrical connection.

Figure 3:
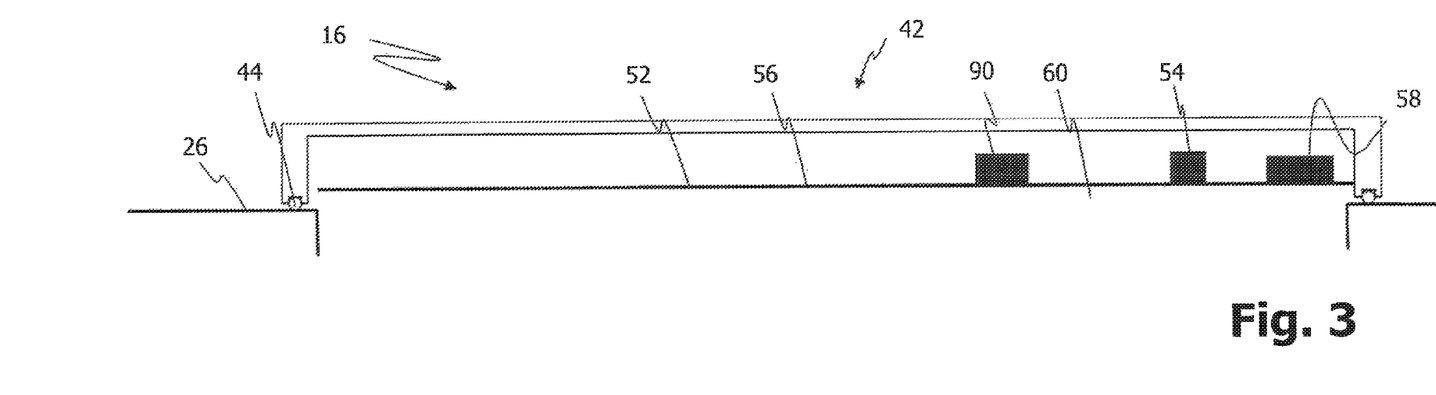
FIG. 3 shows a second embodiment of a sensor assembly.

In the embodiment of the sensor assembly 16 shown in FIG. 2, the interior space of the housing 42 does not necessarily have to be of vacuum-tight design. This is because the vacuum-tight sealing of the vacuum region of the master cylinder 12 is effected via the housing bottom side 46 in combination with the encircling sealing element 44 between the housing bottom side 46 and the master cylinder housing 26. A vacuum leak via the housing opening 60 is prevented by the housing opening 60 being vacuum-tightly sealed by means of the vacuum sensor 54 (or the printed circuit board 52). FIG. 3 shows a second embodiment of the sensor assembly 16, in which a vacuum also prevails in the interior space of the housing 42. In the following, similar elements are provided with the same reference symbols as in the first embodiment.

In the embodiment of the sensor assembly 16 shown in FIG. 3, no pressure difference-based vacuum sensing is required, owing to a different configuration of the vacuum sensor 54. For this reason, a vacuum can also prevail in the interior space of the housing 42 and the housing shape can therefore be simplified. In the embodiment according to FIG. 3, the housing 42 surrounds the vacuum sensor 54, the travel sensor 56 and the position sensor 90 merely laterally and at the top. The vacuum region of the master cylinder 12 can therefore continue into the interior space of the housing 42.

Figures 4, 5:
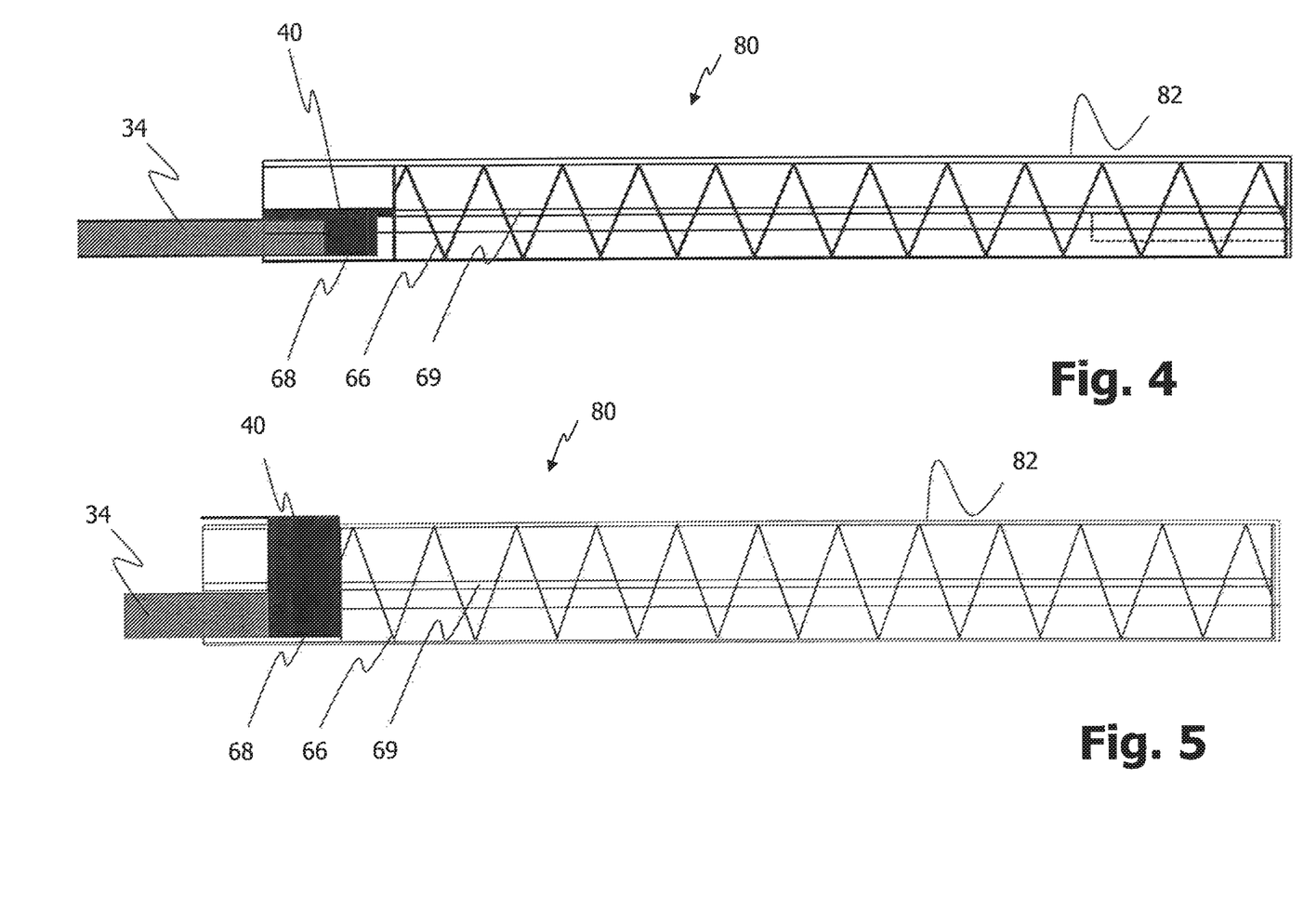
FIG. 4 shows a first embodiment of a signal transmitter cartridge for a sensor assembly.
FIG. 5 shows a second embodiment of a signal transmitter cartridge for a sensor assembly.

In the embodiment according to FIG. 2, the signal transmitter element 40 may be provided in a cartridge for insertion in the recess 38 of the master cylinder housing 26. FIG. 4 shows an embodiment of such a cartridge 80. As shown in FIG. 4, the cartridge 80 comprises a cartridge housing 82 which defines in the interior a channel for a translational movement of the signal transmitter element 40. In the cartridge 80, the signal transmitter element 40 is preconfigured on the slide 68 and is biased by the spring element 66 into its starting position according to FIG. 4. Inside the cartridge housing 82, the groove 69 for a guided movement of the slide 68 is formed. For mounting the cartridge 80, the latter is inserted into the recess 38 of the master cylinder housing 26 in a first step. In a second step, the plunger 34 is coupled to the slide 68 (for example by means of a snap-in, plug-in or bayonet connection). The cartridge housing 82 has an opening (not shown in FIG. 4) in order to enable a communication of the vacuum sensor 54 with the interior space of the cartridge housing 82 and hence the vacuum region of the master cylinder 12.

FIG. 5 shows a further embodiment of a cartridge 80. While the signal transmitter element 40 according to FIG. 4 is a magnetic element for sensing by means of a Hall sensor, FIG. 5 shows a signal transmitter element 40 in the form of a reflector, transducer or similar component located outside the cartridge housing 82. The travel sensor 56 and the position sensor 90 are adapted accordingly.

The cartridges 80 shown in FIGS. 4 and 5 may either form a separate assembly or else be combined with the sensor assembly 16 to form a single assembly. In the latter realisation, no separate fastening arrangement is required for the cartridge 80. Rather, the cartridge 80 can be mounted on the master cylinder 12 together with the housing 42 of the sensor assembly 16.

Figure 6:
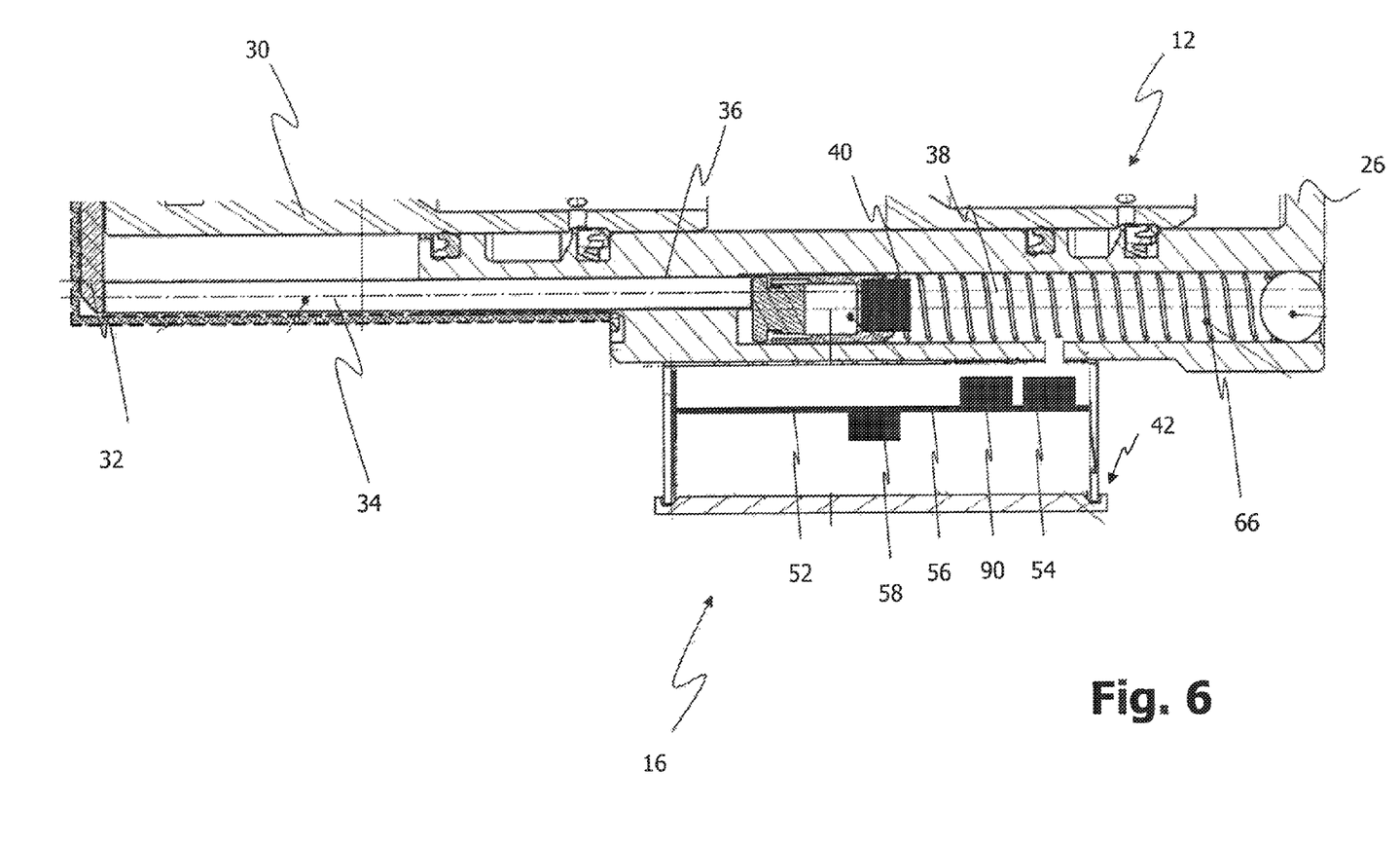
FIG. 6 shows a further embodiment of a master cylinder assembly.
Figure 7:
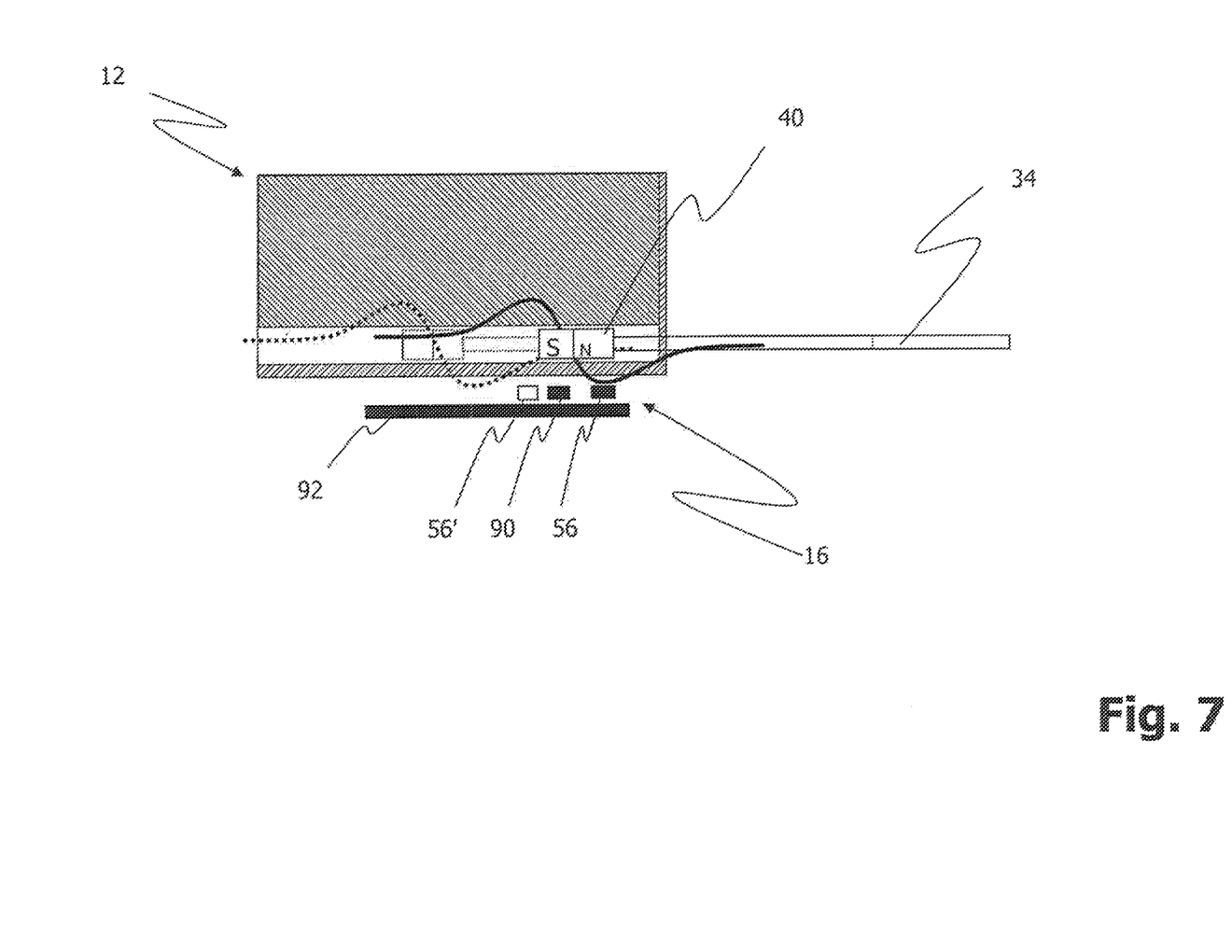
FIG. 7 shows a further embodiment of a master cylinder assembly.

FIGS. 6 and 7 show further embodiments of a master cylinder assembly 10. In the embodiment according to FIG. 6, the sensor assembly 16 again comprises a vacuum sensor 54, a travel sensor 56 and a position sensor 90. In the embodiment according to FIG. 7, by contrast, the sensor assembly 16 does not comprise a vacuum sensor, but a further travel sensor 56' in addition to the travel sensor 56 and position sensor 90.

As already explained, the position sensor 90 enables the sensing of when a predefined position of the signal transmitter element 40 and hence the actuating piston 30 (or the brake pedal coupled thereto) is reached. The position sensor 90 in the embodiments according to FIG. 6 and FIG. 7 is part of a stop light switch (not shown).

The position sensor 90 may assume two switching states and be designed, for example, as a binary (switching) Hall sensor. The travel sensor 56, by contrast, may be a continuous Hall sensor. In one implementation, the position sensor 90 designed as a binary Hall sensor comprises a continuous Hall sensor and a comparator downstream of the continuous Hall sensor. The comparator subjects the output signal of the continuous Hall sensor to a threshold-value decision and outputs either a logical "0" ("OFF") or a logical "1" ("ON") depending on the decision.

While the travel sensor 56 thus provides an analog (continuous) signal, which represents a section of the travel of the actuating piston 30 (and thus of the pedal travel), the position sensor 90 delivers an ON/OFF signal. This ON/OFF signal may be used to switch the stop light on and off. Additionally or alternatively to this, however, it is also possible to calibrate the analog signal of the travel sensor 56 using the ON/OFF signal of the position sensor 90, in order thus to emulate a pedal travel signal with sufficient accuracy.

In certain applications, the pedal travel may be determined on the basis of an output signal of the travel sensor 56 and a separate pedal travel sensor may thus be dispensed with. The pedal travel sensing is an essential prerequisite for implementing an electrohydraulic brake system, a regenerative brake system ("hybrid brake system") or similar concepts. Therefore, the sensor assembly presented here may also be used in conjunction with such brake systems.

In the following, exemplary concepts for the travel sensing and the position sensing are explained with reference to the embodiment according to FIG. 7 in the case of a signal transmitter element 40 formed as a magnetic element. As already noted above, however, signal transmitter elements based on other physical (e.g. optical) concepts may, in principle, also be used.

In the embodiment according to FIG. 7, the master cylinder 12 is made of a non-magnetic material such as aluminium. The signal transmitter element 40 comprises a permanent magnet made, for example, of neodymium-iron-boron alloy. The magnetising direction of the signal transmitter element 40 runs parallel to the translational movement direction of the plunger 34 (as illustrated in FIG. 7 by the magnetic south pole "S" and the magnetic north pole "N"). In FIG. 7, the resulting profile of the magnetic flux density is illustrated in the starting position of the plunger 34 and of the actuating piston 30 (continuous line), i.e. when the brake pedal is not actuated, and in an actuating position of the plunger 34 or of the actuating piston 30 (dotted line), i.e. when the brake pedal is actuated.

A flux guide plate 92 made of a soft-magnetic material of high magnetic permeability is arranged beneath the position sensor 90, the travel sensor 56 and the optional further travel sensor 56'. The flux guide plate 92 shields the sensors 56, 56', 90 from external interference fields and therefore enables higher measuring accuracy. The flux guide plate 92 may be produced, for example, from μ-metal.

Figure 8:
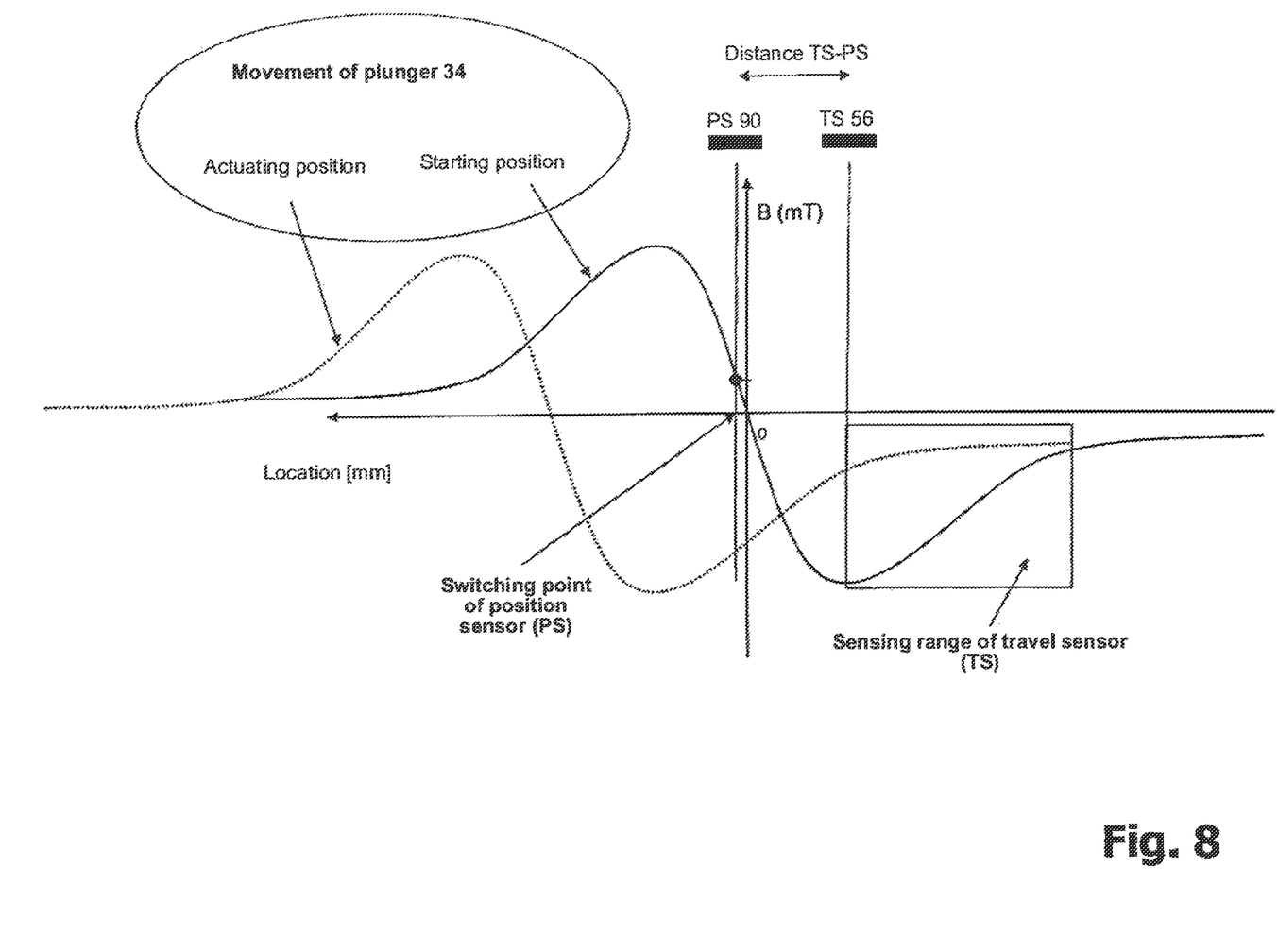
FIG. 8 shows a schematic diagram which illustrates the profile of the magnetic flux density for the embodiment according to FIG. 8.

The profiles of the magnetic flux density which are drawn merely schematically in FIG. 7 are shown more clearly in the diagram of FIG. 8. To be more precise, FIG. 8 illustrates the location-dependent profile of the magnetic flux density B along a straight line running parallel to the plunger 34 and containing both the travel sensor 56 and the position sensor 90. The continuous line illustrates, as in FIG. 7, the flux density profile in the starting position of the plunger 34 when the brake pedal is not actuated. The dotted line indicates the flux density profile in the actuating position of the plunger 34, i.e. when the brake pedal is actuated.

The fact that the flux density profile has two maxima can clearly be seen. The two maxima are arranged in the region of the two poles of the magnetic signal transmitter element 40. The flux density has an approximately linear profile in the section between the two maxima. Furthermore, in the region beyond the two maxima, the flux density has in each case an asymptotically monotonic profile.

FIG. 8 also shows the position of the travel sensor 56 and of the position sensor 90 with respect to the flux density profile. The fact that the distance between the travel sensor 56 and the position sensor 90 is chosen in dependence on a linear extension of the signal transmitter element 40 can be clearly seen. To be more precise, the distance between the travel sensor 56 and the position sensor 90 corresponds to approximately half the length of the signal transmitter element 40. This can be seen from the fact that the travel sensor 56 lies approximately in the region of a flux density maximum in the starting position of the plunger 34, while the position sensor 90 lies approximately in the region between the two flux density maxima in the starting position.

The switching point of the position sensor 90 and sensing range of the travel sensor 56, marked in FIG. 8, result from the above-explained positions of the travel sensor 56 and the position sensor 90 with respect to the flux density profile. In the starting position of the plunger 34, the position sensor 90 is situated in that flux density section which has a steep linear profile. Even a slight movement of the plunger 34 from its starting position therefore causes a considerable change in the magnetomotive force of the position sensor 90, which leads to high sensing accuracy. As can be seen in FIG. 8, the switching point of the position sensor 90 can therefore be positioned very close to the inflection point of the flux density profile.

The sensing range of the travel sensor 56, by contrast, is chosen such that it extends from the location of the highest magnetomotive force (flux density maximum) in the direction of the asymptotically monotonic profile. If the plunger 34 is displaced in relation to its starting position in the direction of the end position, the signal transmitter element 40 moves away from the travel sensor 56, resulting in a monotonic decrease of the magnetomotive force of the travel sensor 56 (and a corresponding monotonic profile of a sensor output signal). In the sensing range illustrated in FIG. 8, the magnetic flux density has a less steep profile than in the region between the two flux density maxima. Although this reduces the measuring accuracy to a certain degree, it has the benefit of a markedly larger measuring range with monotonically changing magnetomotive force.

Figure 9:
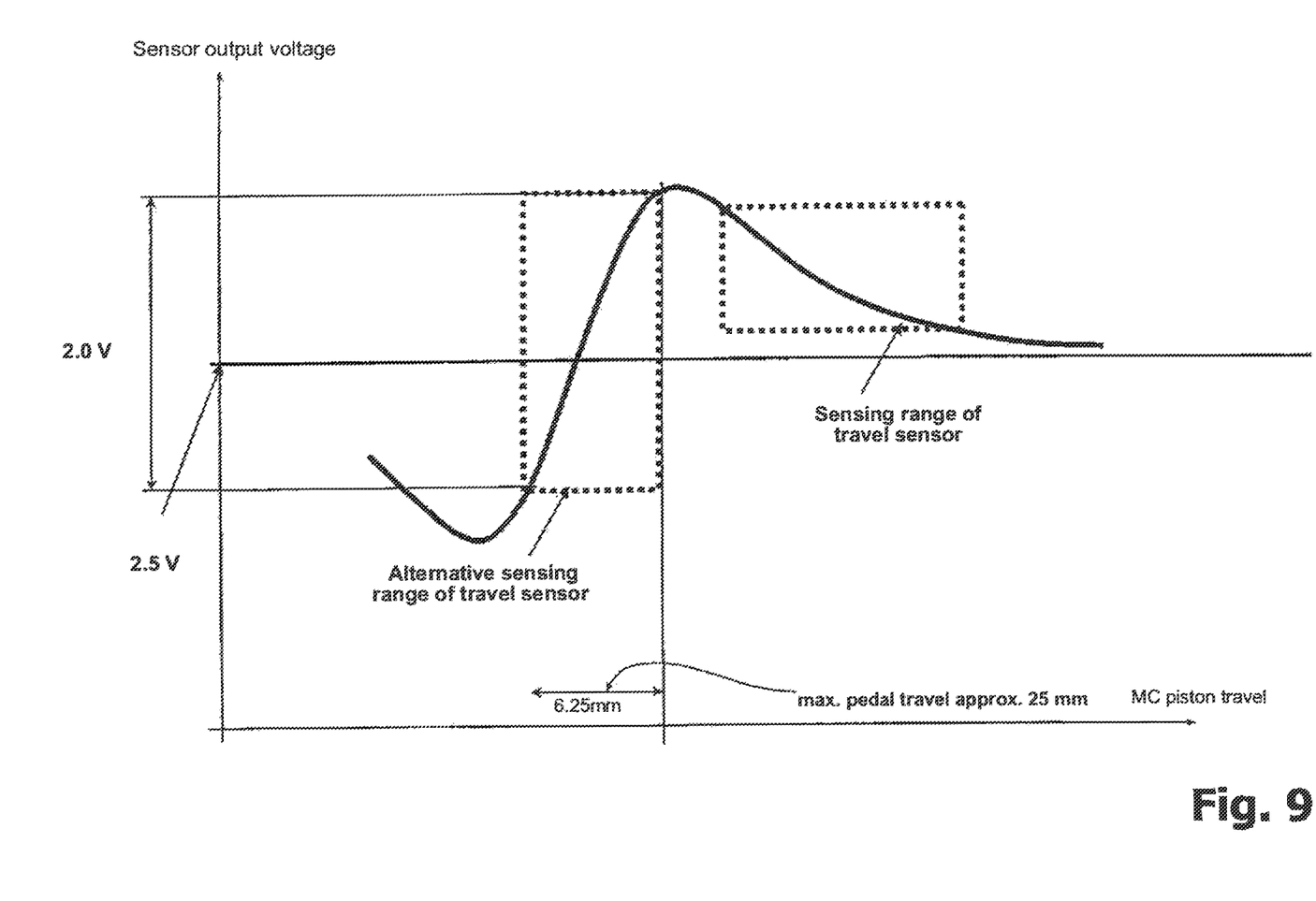
FIG. 9 shows a schematic diagram which illustrates the profile of a sensor output signal and the possible choice of sensing ranges.

FIG. 9 illustrates the profile of an output signal of the travel sensor 56, namely the sensor output voltage, in dependence on the travel performed by the plunger 34 and hence by the actuating piston 30 of the master cylinder 12. The travel performed by the actuating piston 30 is directly proportional to the pedal travel, so that the pedal travel can be determined from the travel performed by the actuating piston 30 via proportionality factor. The travel performed by the actuating piston 30 is in turn to be determined from the change of the sensor output voltage of the travel sensor 56 with the aid of the diagram shown in FIG. 9.

Both the sensing range, illustrated in FIG. 8, of the travel sensor 56 and an alternative sensing range for the travel sensor 56 are marked in FIG. 9. The alternative sensing range is arranged between the two flux density maxima. As already explained above, the alternative sensing range enables greater accuracy of the travel sensing, but possibly at the cost of the maximum travel, which can be sensed, of the actuating piston 30. Of course, the position of the position sensor 90 illustrated in FIG. 8 could be changed, for example as illustrated for the travel sensor 56 in FIG. 8.

As shown in the embodiment according to FIG. 7, in addition to the travel sensor 56, there may be provided a further travel sensor 56' which is arranged, with respect to the travel sensor 56, spatially offset along the movement direction of the plunger 34. The travel sensor 56 is provided in the region of a first maximum of the flux density profile and the further sensor 56' is provided in the region of the second maximum. The sensing and evaluation of the output signals of both travel sensors 56, 56' increases the accuracy of the travel sensing. Moreover, it is possible to run a plausibility check on both travel sensors 56, 56' against one another. In this way, the failure of one travel sensor 56, 56' can be detected. Furthermore, the redundancy increases the reliability of the sensor assembly 12. Although not shown in the embodiment according to FIG. 7, a redundant position sensor could be provided in a similar manner.

In the following, the calibration of the travel sensor 56 on the basis of an output signal of the position sensor 90 is explained with reference to the diagram according to FIG. 10. By means of this calibration, in particular the temperature dependence of the travel measurement can be markedly reduced.

Figure 10:
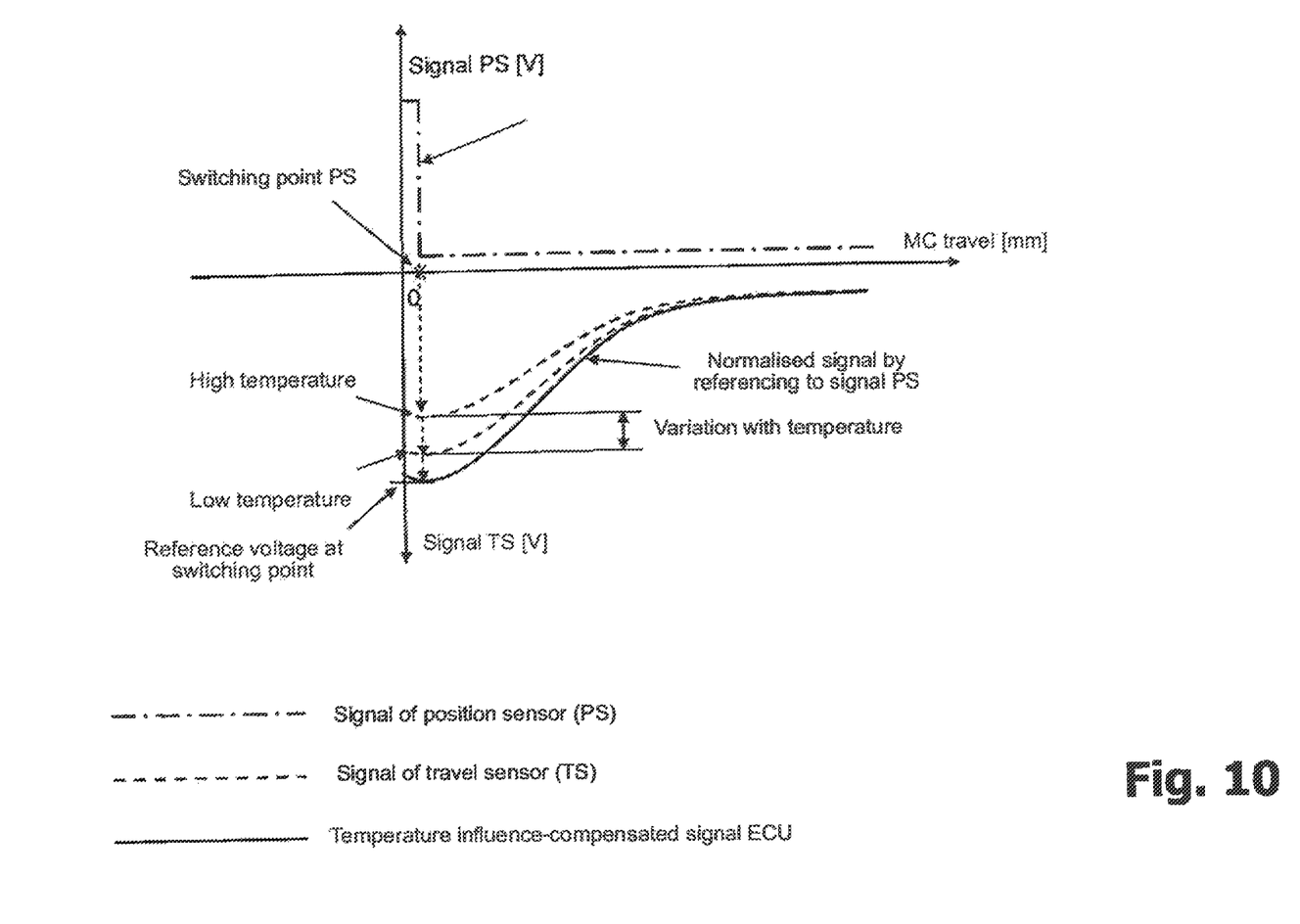
FIG. 10 shows a schematic diagram which illustrates a calibration concept.

The diagram according to FIG. 10 illustrates in the upper half the output signal (output voltage) of the position sensor 90 and in the lower half the output signal (output voltage) of the travel sensor 56 in dependence on the travel performed by the actuating piston 30 from its starting position. As shown in FIG. 10, the output signal of the position sensor 90 shows the expected binary profile with a step change of the signal level at a predefined switching point. In practice, it has turned out that the position of the switching point has no significant temperature dependence.

The profile of the output signal of the travel sensor 56 shown in the lower half of the diagram of FIG. 10 shows the expected continuous profile in correspondence with the continuous change of the magnetomotive force of the travel sensor 56. The high dependence of the profile of the output signal of the travel sensor 56 on the temperature can be clearly seen.

In order to compensate for the temperature dependence of the output signal of the travel sensor 56, a calibration of this output signal on the basis of the substantially temperature-independent switching point of the position sensor 90 is proposed. To be more precise, on sensing the switching point of the position sensor 90, the output signal of the travel sensor 56 is referred to a reference signal. In this connection, a gain for the output signal of the travel sensor 56 is adjusted in such a manner that the normalised signal (reference signal) shown as a continuous line in FIG. 10 always results. The adjustment of the gain, and the signal amplification can be carried out in an ECU, in order to obtain a temperature influence-compensated signal. The calibration may be carried out again on each actuation of the brake pedal.

Figure 11:
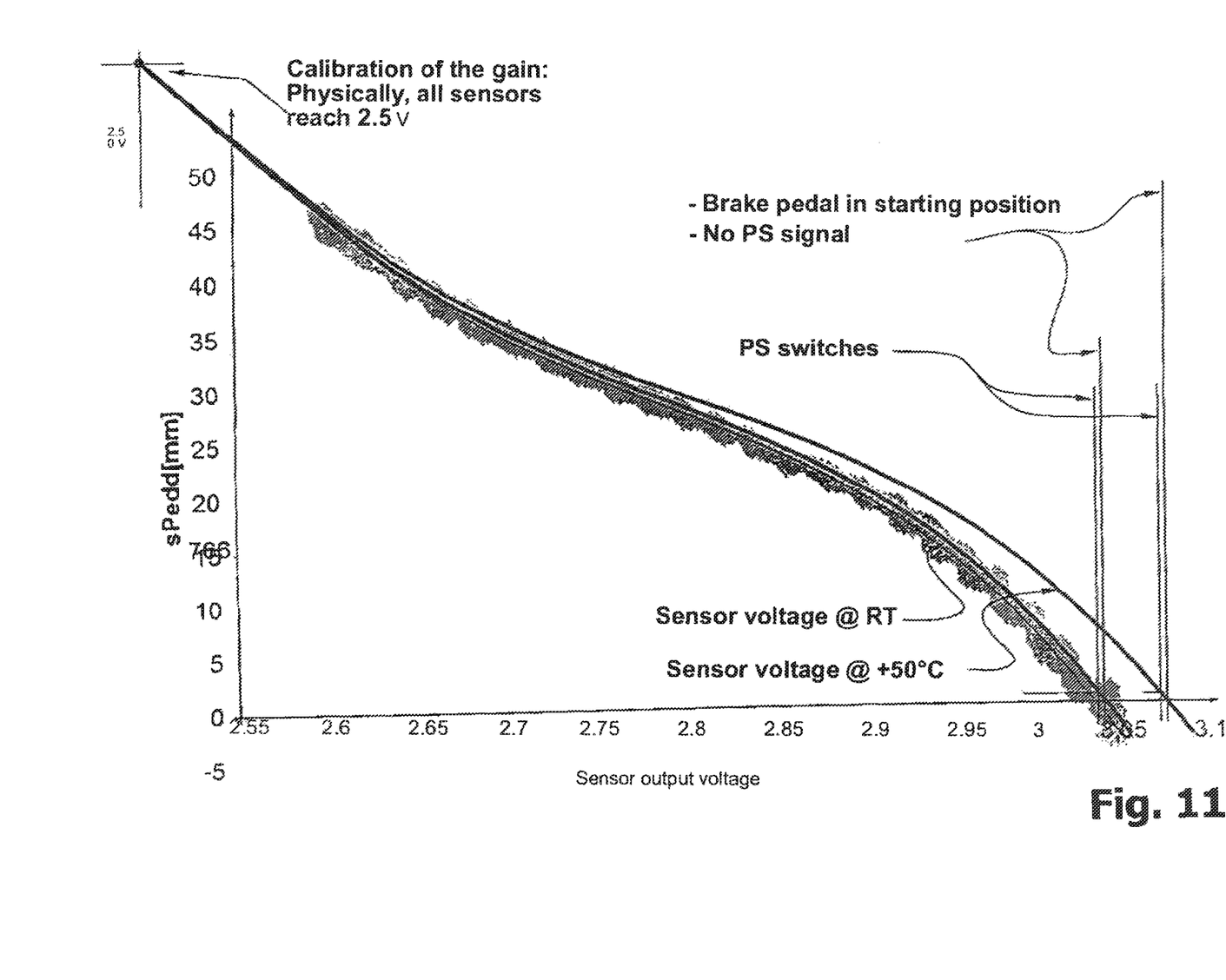
FIG. 11 shows a schematic diagram which further illustrates the calibration concept.

FIG. 11 shows in a further diagram the profile of the sensor output voltage of the travel sensor 56 in dependence on the pedal travel at room temperature and at a temperature of 50° C. Once again, the high temperature dependence of the sensor output signal can be clearly seen. Likewise marked in FIG. 11 is the switching point of the position sensor 90. This switching point, which is defined in relation to the starting position of the plunger 34 or the actuating piston 30, has practically no temperature dependence and is therefore suitable as a reference point for the calibration of the travel sensor 56. As can likewise be seen in FIG. 11, the output signal of the travel sensor 56 formed as a Hall sensor approaches the asymptotic value 2.5 V with increasing pedal travel. This fact enables the calibration of the travel sensor 56 on the basis of the choice of the gain explained above.

According to a development of the embodiments, a plausibility check may be run on the output signal of the position sensor 90 on the basis of another signal indicating a braking procedure. If, for example, a braking procedure is detected on the basis of an output signal of a wheel speed sensor or a longitudinal acceleration sensor, without the position sensor 90 changing its switching state, this indicates an error condition.

Figure 12:
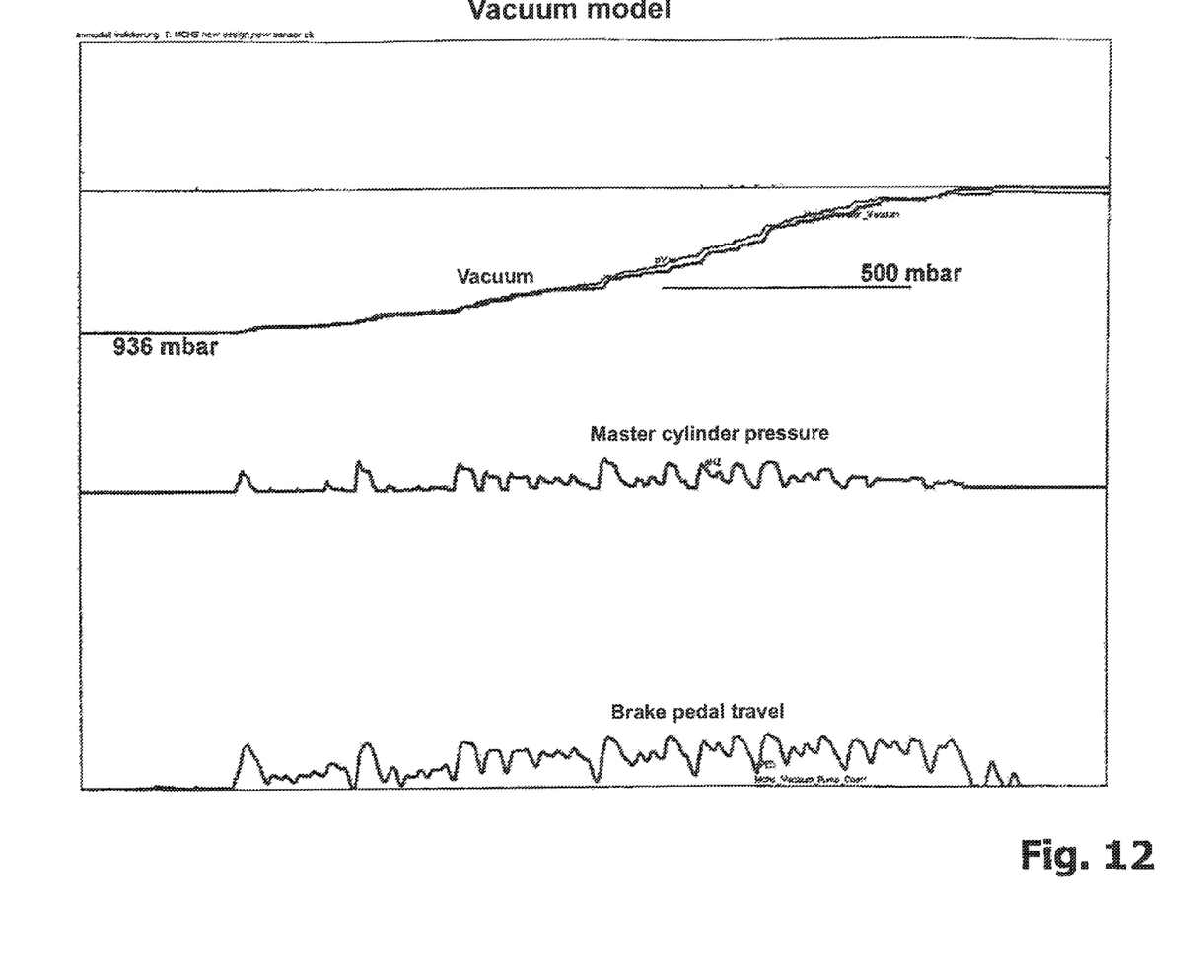
FIG. 12 shows a schematic diagram which illustrates the determination of the brake booster vacuum on the basis of the brake pedal travel.

FIG. 12 explains the correlation between the brake pedal travel, as can be determined for example on the basis of the output signal of the travel sensor 56, and of the vacuum in the vacuum chamber 20 of the brake booster 14 (cf. FIG. 1). It has been found that by means of a mathematical model the vacuum shown in FIG. 12 can be related to the brake pedal travel, likewise shown in FIG. 12. By means of this model, the vacuum prevailing in the brake booster 14 can thus be determined on the basis of the output signal of the travel sensor 56. The vacuum sensor, shown for example in FIG. 2, can therefore be dispensed with in certain embodiments. It is likewise possible in certain embodiments to dispense with a separate pedal travel sensor, which in other embodiments may be provided in additional to the travel sensor 56.

As emerges from the embodiments, the sensor assembly concept presented here enables simplified mounting of the sensors on the master cylinder. A wide range of sensors (optional vacuum sensor for system failure detection, travel sensor e.g. for pedal travel determination, position sensor e.g. for stop light switch, etc.) may be integrated into a single housing which can be attached to the outside of the master cylinder in a simple manner. The sensor centre signals may be read by means of a common electrical connection and mutually subjected to a plausibility check or calibrated.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A sensor assembly for use with a master cylinder, which master cylinder has an input-side actuating element, a signal transmitter element detectable by sensors being coupled to the actuating element, and the sensor assembly comprising:
    a travel sensor for sensing travel performed by the actuating element;
    a position sensor for sensing when a predefined position of the actuating element is reached; and
    a circuit device which is designed to calibrate the travel sensor, when the position sensor senses the predefined position, by referring an output signal of the travel sensor to a reference signal and adjusting the output signal of the travel sensor to the reference signal.

2. A sensor assembly according to claim 1, the travel sensor providing an analog signal.

3. A sensor assembly according to claim 1, the position sensor providing a binary signal.

4. A sensor assembly according to claim 1, the travel sensor and the position sensor being at a distance from one another and the distance being chosen in dependence on a linear extension of the signal transmitter element.

5. A sensor assembly according to claim 4, the distance between the travel sensor and the position sensor corresponding to approximately half the length of the signal transmitter element.

6. A sensor assembly according to claim 1, the travel sensor and the position sensor being designed to sense a magnetic flux density.

7. A sensor assembly according to claim 6, the travel sensor being placed in such a manner that, in a starting position of the actuating element, the travel sensor lies approximately in a region of a first flux density maximum.

8. A sensor assembly according to claim 1, the sensor assembly comprising a further travel sensor.

9. A sensor assembly according to claim 8, the further travel sensor being placed in such a manner that, in a starting position of the actuating element, the further travel sensor lies approximately in a region of a second flux density maximum.

10. A sensor assembly according to claim 1, the position sensor being placed in such a manner that, in a starting position of the actuating element, the position sensor lies approximately in a region between two flux density maxima.

11. A sensor assembly according to claim 1, the position sensor being part of a stop light switch.

12. A sensor assembly according to claim 1, the travel sensor and the position sensor being selected from a sensor group comprising the following sensors: Hall sensor, AMR sensor, GMR sensor, CMR sensor, Reed relay.

13. A sensor assembly according to claim 1, further comprising
    a vacuum sensor for sensing a vacuum in a vacuum region, provided for communication with a vacuum brake booster, of the master cylinder; and
    a housing which accommodates the vacuum sensor, the travel sensor and the position sensor, the housing having a housing opening which permits a communication of the vacuum sensor with the vacuum region of the master cylinder, and a fastening arrangement for mounting the housing on the outside of the master cylinder.

14. A master cylinder assembly, comprising
    a master cylinder which has the input-side actuating element, a signal transmitter element coupled to the actuating element of the master cylinder and detectable by sensors being provided; and
    a sensor assembly according to claim 1.

15. A master cylinder assembly according to claim 14, further comprising a plunger coupled to the actuating element of the master cylinder, the plunger carrying the signal transmitter element.

16. A method for operating a sensor assembly for use in combination with a master cylinder, which master cylinder has an input-side actuating element, to which a signal transmitter element detectable by sensors is coupled, the sensor assembly comprising a travel sensor and a position sensor and the method comprising the following steps:
- sensing a travel performed by the actuating element by means of the travel sensor;
- sensing when a predefined position of the actuating element is reached by means of the position sensor; and
- calibrating the travel sensor, when the predefined position is sensed, by referring an output signal of the travel sensor to a reference signal and adjusting the output signal of the travel sensor to the reference signal.

17. The method according to claim 16, comprising comparing the travel performed and when the predefined position is reached.

18. The method according to claim 16, comprising running a plausibility check on the output signal of the position sensor.

19. The method according to claim 18, the running of the plausibility check on the output signal of the position sensor comprising a redundant evaluation of another signal indicating a braking procedure.

20. The method according to claim 16, comprising determining a brake pedal travel on the basis of the output signal of the travel sensor.

21. The method according to claim 16, comprising determining a vacuum in a vacuum brake booster on the basis of the output signal of the travel sensor.

* * * * *